United States Patent [19]

Rossberg

[11] Patent Number: 4,779,788
[45] Date of Patent: Oct. 25, 1988

[54] HERMETICALLY SEALED GLASS FIBER BUSHING

[75] Inventor: Rolf Rossberg, Schwieberdingen, Fed. Rep. of Germany

[73] Assignee: Standard Elektrik Lorenz A.G., Stuttgart, Fed. Rep. of Germany

[21] Appl. No.: 119,654

[22] Filed: Nov. 12, 1987

[30] Foreign Application Priority Data

Nov. 12, 1986 [DE] Fed. Rep. of Germany ....... 3638595
Nov. 12, 1986 [DE] Fed. Rep. of Germany ....... 3638594

[51] Int. Cl.$^4$ ........................... B23K 1/19; B23K 3/00
[52] U.S. Cl. ...................................... 228/57; 228/215; 228/221
[58] Field of Search ............... 228/122, 131, 215, 216, 228/219, 220, 221, 57; 174/70 R, 70 S; 350/96.18, 96.20, 96.21, 96.23

[56] References Cited

U.S. PATENT DOCUMENTS

| 4,131,905 | 12/1978 | Hanes et al. | 357/74 |
| 4,580,874 | 4/1986 | Winter et al. | 350/96.21 |
| 4,615,031 | 9/1986 | Eales et al. | 350/96.2 |
| 4,741,589 | 5/1988 | Halder et al. | 350/96.2 |

Primary Examiner—M. Jordan
Attorney, Agent, or Firm—Peter C. Van Der Sluys

[57] ABSTRACT

To avoid having to metallize a bare glass fiber prior to soldering it into a hole of a metal part to obtain a hermetically sealed lead-through bushing, the solder is permitted to shrink onto the glass fiber. This is achieved by either soldering an additional solder body to the metal part outside the hole or providing the wall of the hole with a nonsolderable coating over part of its length. If the metal part is designed as a sleeve, a recess exposing part of the hole causes the solder to firmly shrink on to the bare glass fiber during solidification. The hermetic seal is obtained by arranging the connections of the solder with the metal part and with the glass fiber essentially one behind the other in the longitudinal direction of the glass fiber.

21 Claims, 4 Drawing Sheets

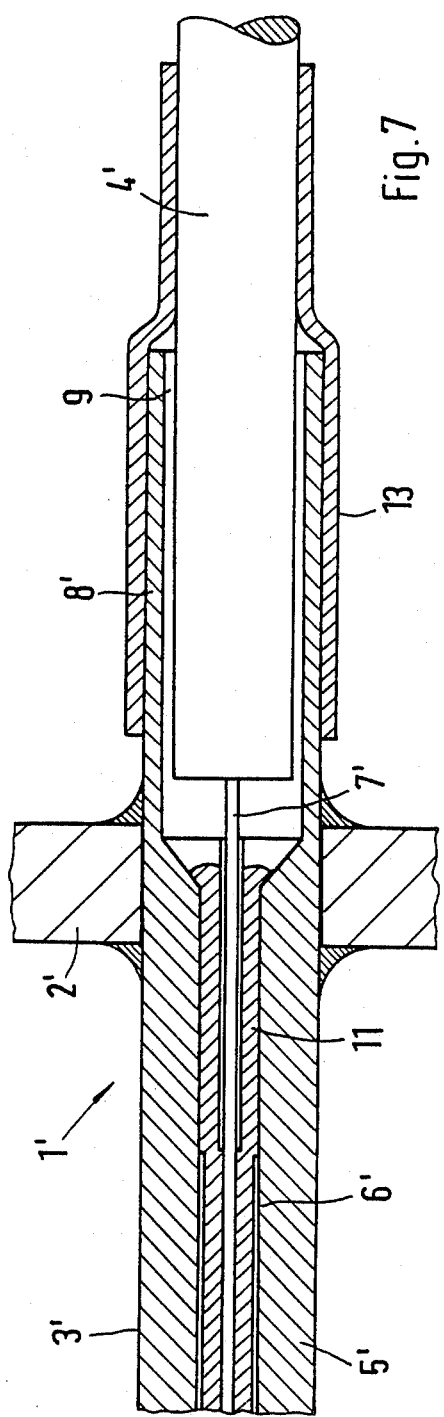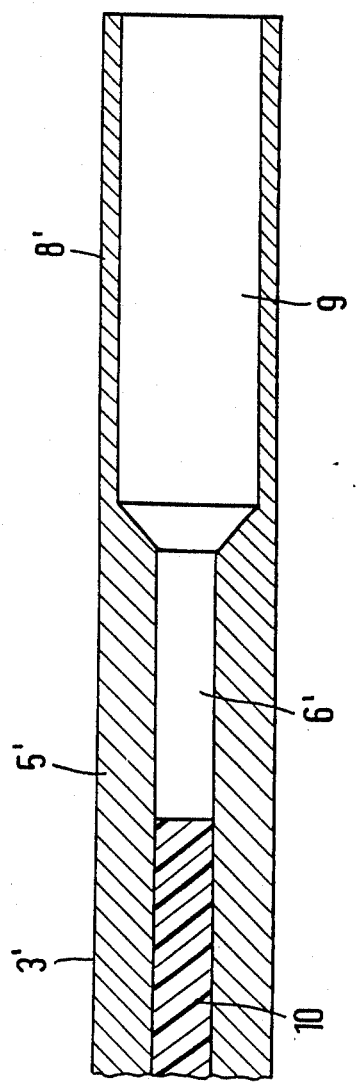

HERMETICALLY SEALED GLASS FIBER BUSHING

BACKGROUND OF THE INVENTION

1. Field of the Invention

The present invention relates to a glass fiber bushing and more particularly to a hermetically sealed bushing for feeding a glass fiber through a metal part in which the fiber is fixed in a hole by soldering.

2. Description of the Prior Art

Such fiber bushings are used, for example, in optical communications, in particular for hermetically sealed housings of electro-optical or opto-electrical components which must be protected against environmental influences.

To fix the bare glass fiber, a metal solder is preferably used, which has a higher temperature resistance than adhesive and is moisture proof. The solder prevents the glass fiber from "creeping".

Printed publications DE-OS No. 27 21 991 and DE-OS No. 30 46 415 teach that it is necessary to metallize the glass fiber prior to soldering. The metallization must meet several quality requirements. On the one hand, it must adhere very well to the glass fiber. On the other hand, the metallization must be easily solderable.

To achieve good adhesion, it is essential that the fiber surface be very clean. Cleaning may be accomplished using one of several alternative process steps, e.g., by immersing the glass fiber in hot sulfuric acid with subsequent washing in deionized water and drying, or by chemically etching the glass fiber in hydrofluoric acid with subsequent washing and drying.

However, since firmly adhering metallization coatings can often be soldered only with difficulty, or not at all, two or more metal coatings must be applied either successively, or simultaneously as a mixture. This can be effected by evaporation or sputtering in a vacuum, or by a wet chemical process. To this end, tools, devices and means are required which are available in glass fiber bushing manufacturing facilities, but not in the field. Accordingly, glass fibers cannot be practically metallized, and, consequently, not soldered at the sites where optical transmission devices are being installed and where the required locations of bushings can be determined.

Even during manufacturing, difficulties occur when glass fibers are metallized since the fiber can easily break. Fibers are particularly vulnerable to breakage at the interface between the treated and untreated surfaces, or at the transition to the metallization coating. Moreover, it has been found that the metallization tends to dissolve during soldering, the adhesion thus being reduced or lost entirely. Therefore, when the molten solder cools in the metal sleeve it shrinks and it is possible that the solder may detach entirely from the glass fiber or leave capillaries which prevent achieving a hermetic seal. Furthermore, in the event of tensile stress, the fiber can slip out of the solder.

It is therefore an object of the invention to provide a hermetically sealed glass fiber bushing for feeding a glass fiber through a hole in a metal housing and for fixing the fiber in said hole. It is a further object to provide such a bushing which can be manufactured at reduced costs, offer excellent tightness, and be produced in the field, if necessary.

In accordance with the invention, these objects are uniquely achieved by using the characteristics of molten solder that created the problem, namely, shrinkage during cooling and surface tension. Excess solder is provided outside the hole to form a solder body surrounding and adhering to a bare unmetallized glass fiber. The solder body is also permanently connected with the outside of the metal housing and with at least part of the length of the wall of the hole.

In a second embodiment the hole has a metal sleeve soldered therein. The sleeve has an opening therethrough having a wall with nonsolderable coating over part of its length. Solder hermeticlly surrounds the bare, unmetallized fiber in the area of the nonsolderable part of the wall while in the solderable portion of the wall the solder firmly adheres to the wall.

In a third embodiment a metal sleeve is also used, the sleeve having a recess partly exposing the opening. In the area of the recess the solder hermetically surrounds the bare unmetallized fiber while in the area of the opening without the recess the solder adheres to the opening wall.

Numerous advantages are offered by the invention. Firstly, it is no longer necessary to metallize the glass fiber. Secondly, the complex washing steps hitherto required can be eliminated. Thirdly, the bushing has a high, reliable degree of tightness which can be achieved even if the bushings are produced in the field. Further advantages of the invention will become apparent as this description proceeds.

DESCRIPTION OF THE DRAWINGS

FIG. 7 is a partly longitudinal section of part of a hermetically sealed glass fiber bushing attached to the opening of a housing wall.

FIG. 8 is a longitudinal section of part of a metal sleeve prepared for receiving a glass fiber to be soldered in.

DETAILED DESCRIPTION OF THE INVENTION

Figure 1:
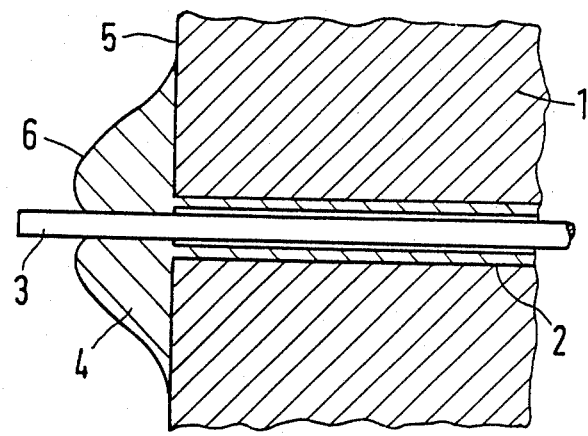
FIG. 1 is a longitudinal section of part of a hermetically sealed glass fiber bushing.
Figure 2:
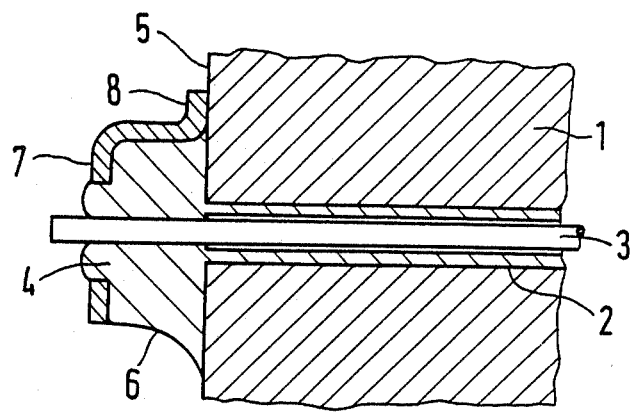
FIG. 2 is a longitudinal section of part of a glass fiber bushing with a shackle attached to an outside surface of the bushing.
Figure 4:
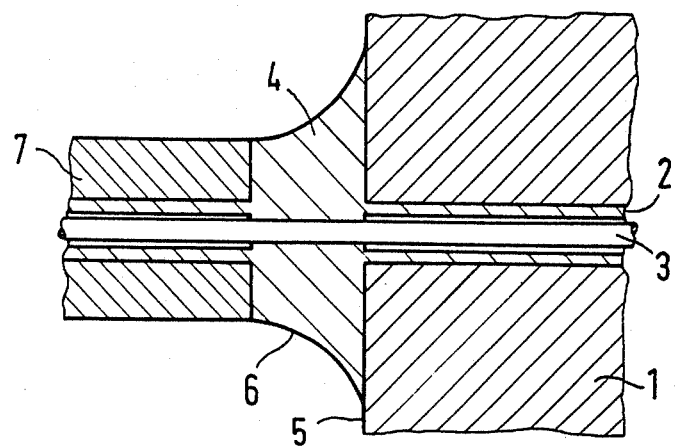
FIG. 4 is a longitudinal section of part of a glass fiber bushing with a sleeve located in front of the bushing.

In the drawings, a first metal part of a hermetically sealed glass fiber bushing is designated with reference numeral 1. The flrst metal part 1 shown in FIGS. 1, 2 and 4 is preferably the wall of a hermetically sealed housing or a holding plate whlch may be located inside such a housing. The metal part 1 is penetrated by a hole 2 in which the glass fiber 3 is fixed by soldering. The glass fiber 3 is a bare, unmetallized portion of an optical waveguide from which the primary coating has been removed. During soldering, the hole 2 is filled with molten solder 4 either completely or over at least part of its length. Outside the hole 2, on at least one outside surface 5 of the metal part 1, a molten solder body 6 is formed, e.g., in the shape of a solder bead.

When cooling, the molten solder 4 shrinks. When the solder shrinks, the free surface of the solder body 6 also shrinks under the influence of surface tension, thereby drawing the solder towards the hole 2 and onto and around the bare glass fiber 3 thereby hermetically surrounding the fiber. Inside the hole 2, however, the molten solder detaches from the glass fiber 3 during shrinking, and adheres to the wall of hole 2 thereby forming a hermetically sealed connection with the wetted hole wall. In this manner, the transition between the solder 4 inside the hole 2 and the solder outside the hole forms a hermetic seal between the metal part 1 and the glass fiber 3. Furthermore, the different coefficients of expansion of the two materials cause the glass fiber 3 to be firmly sealed in the solder 4 in a torsionfree manner. If inadmissible tensile stress occurs, the glass fiber does not have a tendency to break at or near the soldered joint as in the prior art, but breaks at any random location that may have a weakness.

Figure 3:
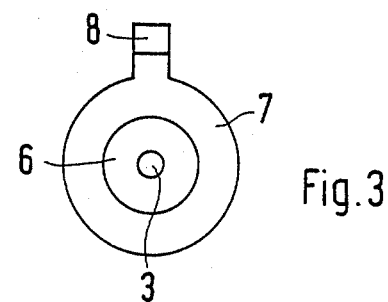
FIG. 3 is a top view of the shackle of FIG. 2.

In FIG. 2, the solder body 6, which is permanently connected with the metal part 1 on the outside surface 5, is connected with a second metal part 7 for controlling the height of the solder in the longitudinal direction of the glass fiber 3. Part 7 not only determines the height of the solder body 6, but also guarantees a minumum height of the solder body 6 which ensures tightness. In the embodiment shown, this second metal part 7 is a shackle, shown in FIG. 3, stamped from sheet metal with a holding lug whose free end 8 is fixed to the outside 5 of the first metal part 1. Instead of the shackle, a simple wire stirrup may be used to control the height of the solder body 6. What is important is that the molten solder be provided with free surfaces which permit the solder 4 to shrink around the glass fiber 3 when cooling down. The solder will adhere to part 7 thereby maintaining a minimum height of solder around the fiber which the free surface will draw inwardly towards fiber 3 to surround the fiber.

Figure 5:
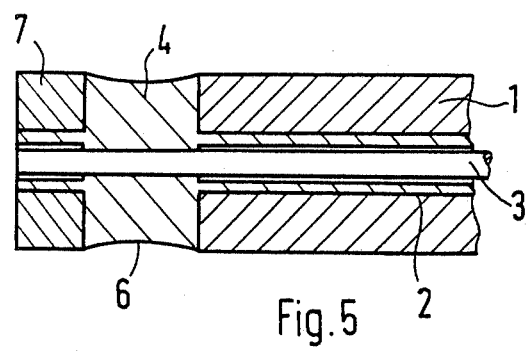
FIG. 5 is a longitudinal section of part of a glass fiber bushing with a ring located in front of the bushing.
Figure 6:
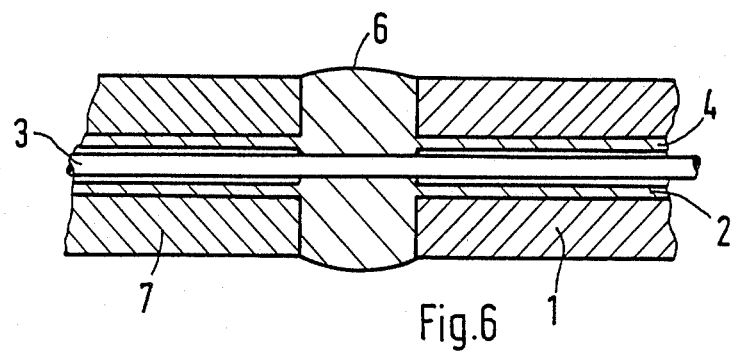
FIG. 6 is a longitudinal section of part of a glass fiber bushing consisting of two sleeves, with a solder body disposed between the sleeves.
Figure 9:
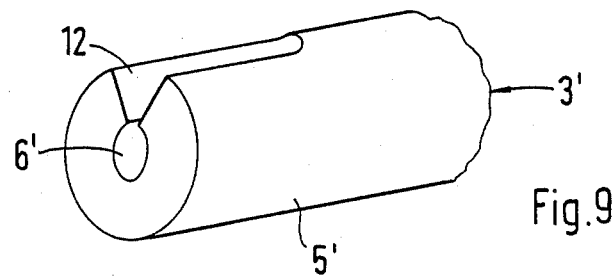
FIG. 9 is a prespective view of the front portion of a metal sleeve provided with a recess.
Figure 10:
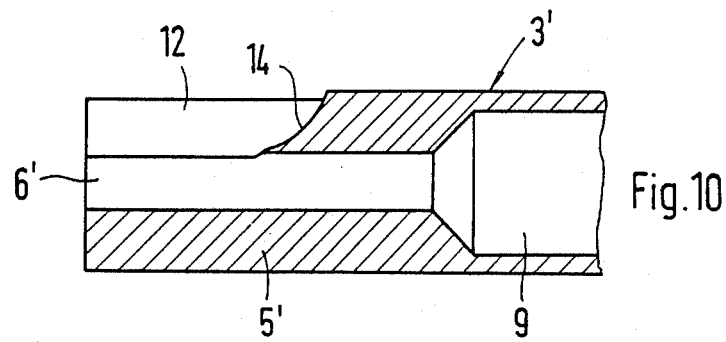
FIG. 10 is a longitudinal section of the front portion of the metal sleeve of FIG. 9.
Figure 11:
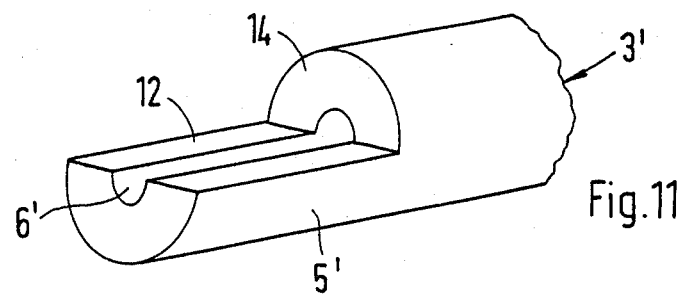
FIG. 11 is a perspective view of the front portion of a metal sleeve with a recess in a modified shape.
Figure 12:
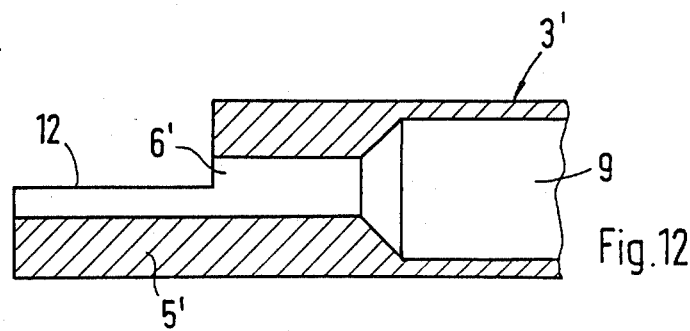
FIG. 12 is a longitudinal section of the front portion of the metal sleeve of FIG. 11.

In the embodiments of hermetially sealed glass fiber bushings shown in FIGS. 4 to 6, the second metal parts 7 are held in a desired spaced relationship from the first metal parts with a simple tool during soldering. After the solder 4 has solidified, the glass fiber 3 is hermetically embedded, and the second metal part 7 is mechanically fixed to the first metal part 1 by the solder body 6. The second metal part 7 connected with the solder body 6 can be designed as a ferrule, a ring, a perforated disk, a holding plate or the wall of a second housing. As is shown in FIGS. 5 and 6, the first metal parts 1 are also sleeves on whose front ends the solder body 6 is located. In each of these embodiments the solder body 6 has a free surface that can shrink during cooling to draw the solder inwardly towards the bare fiber.

In FIG. 7, a hermetically sealed bushing 1' is located in the opening of, for example, a housing wall 2' to which it is also connected in an airtight manner. The bushing is constituted by a metal sleeve 3' with a jacketed fiber 4' fixed therein. The front portion 5' of the metal sleeve 3' has a hole 6' having a relatively small diameter for receiving the bare glass fiber 7', and the rear portion 8' of the sleeve has a hole 9 having a large diameter for receiving part of the complete jacketed fiber 4'.

In the embodiment of the bushing 1' shown in FIGS. 7 and 8, the wall of part of the length of the hole 6' is provided with a nonsolderable coating 10 after the metal sleeve 3' has been produced. This coating 10, which may either be a solder resist or may be formed by an oxidized surfaced of the hole wall, may either be located in the front or the rear portion of the hole 6', depending on which is more appropriate.

The glass fiber 7', which was previously stripped of its jacket and the primary coating by conventional means, is fed through the metal sleeve, which has been prepared for soldering by heating to a suitable temperature. The fiber is then soldered to the sleeve in a solder bath. After having been removed from the bath, the metal sleeve 3' and the soldered joint will cool. The solidifying solder 11 shrinks on the bare glass fiber 7', in the area of the coating 10 which has remained unwetted, and hermetically surrounds the glass fiber 7'. In the uncoated area of the hole 6', the solder 11 detaches from the glass fiber 7' when solidifying and shrinking to form a hermetic seal with the wetted hole wall. In this manner, the transition from one portion of the soldered area to the other forms a hermetic seal between the metal sleeve 3', and the glass fiber 7', which, due to the different thermal coefficients of expansion, is held firmly in the solder 11 over a part of the length of the solder and is torsionfree. If inadmissible tensile stress occurs, the glass fiber does not tend to break at or near the soldered joint as in the prior art, but may break at any random location. To prevent the transmission of unintended tensile stress to the glass fiber 7', the jacketed fiber 4' is glued into the rear portion of the hole 9, and/or is fixed to the metal sleeve 3' by means of a shrink tube 13 surrounding the rear portion 8' of the sleeve.

Other embodiments of metal sleeves 3', which when the soldered joint cools, ensure that the solder 11 shrinks on the bare glass fiber 7' are shown in FIGS. 9 to 12. To prevent the hole wall from being wetted completely with solder 11, part of the wall is removed where the nonsolderable coating is present in the previously described embodiments. This is achieved by providing the front portion 5' of the metal sleeve 3' with a recess 12 partly exposing the hole 6'. Since the glass fiber 7' which is exposed here would float on the molten solder 11 during soldering, it must be held down until the solder solidifies.

A further result is that the solder 11 in the area of the recess 12 hermetically surrounds the bare, unmetallized glass fiber 7'. By contrast, in that area of the hole 6' in which there is no recess, the solder 11 is connected primarily with the hole wall in a hermetically tight manner.

The recess 12 may be, for example, a slot extending in the longitudinal direction of the hole 6', such slot having sidewalls which are parallel or V-shaped in relation to each other, or being constituted by a cut reducing the cross section of the metal sleeve 3'. The recess 12 may either begin at the front end of the metal sleeve 3' or be located in such a manner in an area more remote from the front portion 5' that an intact sleeve section is present at the front. The end surfaces 14 of the recess 12 may thus be curved as in FIG. 10 inclined, or perpendicular to the axis of the sleeve as in FIG. 11.

What is claimed is:

1. A hermetically sealed bushing, for feeding a glass fiber through a hole in a metal part in which the fiber is fixed in the hole by soldering, comprising:
   a solder body formed on a surface of the metal part adjacent the hole, said solder body hermetically surrounding the glass fiber and being permanently connected both with the surface of the metal part and with at least a portion of the length of the wall of the hole.

2. A hermetically sealed bushing as claimed in claim 1, wherein the solder body, which is permanently connected with the metal part, is connected with a second metal part for controlling the height of the solder in the longitudinal direction of the glass fiber.

3. A hermetically sealed bushing as claimed in claim 2, wherein the second metal part is a shackle attached to the first metal part.

4. A hermetically sealed bushing as claimed in claim 2, wherein the second metal part is a wire stirrup attached to the first metal part.

5. A hermetically sealed bushing as claimed in claim 2, wherein the second metal part is a ring spaced from the first metal part.

6. A hermetically sealed bushing as claimed in claim 2, wherein the second metal part is a sleeve spaced from the first metal part.

7. A hermetically sealed bushing as claimed in claim 2, wherein the second metal part is a wall spaced from the first metal part.

8. A hermetically sealed bushing as claimed in claim 1, wherein the first metal part is a wall.

9. A hermetically sealed bushing as claimed in claim 1, wherein the first metal part is a sleeve.

10. A hermetically sealed bushing, for feeding a glass fiber through a hole in a metal part in which the fiber is fixed in the hole by soldering, comprising:
    a metal sleeve having an opening therethrough defined by an inner wall, said inner wall having a nonsolderable coating over part of its length; and
    solder hermetically surrounding a glass fiber in the area of the nonsolderable part of the inner wall, while in the area of the solderable part of the inner wall, the solder firmly adheres to the inner wall.

11. A hermetically sealed bushing as claimed in claim 10, wherein the coating covers a front portion of the inner wall.

12. A hermetically sealed bushing as claimed in claim 10, wherein the coating covers a rear portion of the inner wall.

13. A hermetically sealed bushing as claimed in claim 10, wherein the coating is a solder resist.

14. A hermetically sealed bushing as claimed in claim 10, wherein the coating is formed by an oxidized surface of the inner wall.

15. A hermetically sealed bushing, for feeding a glass fiber through a hole in a metl part in which the fiber is fixed in the hole by soldering, comprising:
    a metal sleeve having an opening therethrough defined by an inner wall and a recess partly exposing the inner wall; and
    solder hermetically surrounding a glass fiber in the area of the recess, while in that area of the inner wall of the sleeve which does not have a recess, the solder is permanently connected with the inner wall.

16. A hermetically sealed bushing as claimed in claim 15, wherein the recess is located in a front portion of the metal sleeve.

17. A hermetically sealed bushing as claimed in claim 15, wherein the recess is located in a rear portion of the metal sleeve.

18. A hermetically sealed bushing as claimed in claim 15, wherein the recess is a slot extending in the longitudinal direction of the fiber.

19. A hermetically sealed bushing as claimed in claim 15, wherein the recess is a cut reducing the cross section of the metal sleeve.

20. A hermetically sealed bushing, for feeding a glass fiber through a hole in a metal part in which the fiber is fixed in the hole by soldering, comprising:
    a solder body having a first lungitudinal portion hermetically surrounding the glass fiber and a second longitudinal portion longitudinally displaced from the first portion and permanently connected to the metal part.

21. A hermetically sealed bushing as claimed in claim 20, additionally comprising means for controlling the length of the first longitudinal portion hermetically surrounding the glass fiber.

* * * * *